(12) United States Patent
Yoshida (10) Patent No.: US 9,222,510 B2
(45) Date of Patent: Dec. 29, 2015

(54) LINEAR MOTION GUIDE UNIT WITH INSIDE SEAL (71) Applicant: NIPPON THOMPSON CO., LTD., Tokyo (JP)

(72) Inventor: Yoshihiro Yoshida, Gifu-ken (JP)

(73) Assignee: NIPPON THOMPSON CO., LTD., Tokyo (JP)

( * ) Notice: Subject to any disclaimer, the term of this patent is extended or adjusted under 35 U.S.C. 154(b) by 0 days.

(21) Appl. No.: 14/230,323

(22) Filed: Mar. 31, 2014

(65) Prior Publication Data
US 2014/0294327 A1 Oct. 2, 2014

(30) Foreign Application Priority Data

Mar. 29, 2013 (JP) ................................. 2013-072627

(51) Int. Cl.
*F16C 33/00* (2006.01)
*F16C 29/08* (2006.01)
*F16C 29/06* (2006.01)

(52) U.S. Cl.
CPC ............. *F16C 29/088* (2013.01); *F16C 29/064* (2013.01); *F16C 29/0609* (2013.01)

(58) Field of Classification Search
CPC .. F16C 29/04; F16C 29/0609; F16C 29/0633; F16C 29/0635; F16C 29/0638; F16C 29/064; F16C 29/088; F16C 33/783

USPC .................... 384/15, 43, 44, 49, 50
See application file for complete search history.

(56) References Cited

U.S. PATENT DOCUMENTS

| | | | | |
|---|---|---|---|---|
| 5,340,219 A | * | 8/1994 | Agari | 384/15 |
| 5,342,127 A | | 8/1994 | Agari | |
| 5,451,109 A | * | 9/1995 | Ichida | 384/15 |
| 6,250,805 B1 | * | 6/2001 | Kuwahara | 384/15 |

FOREIGN PATENT DOCUMENTS

| | | | |
|---|---|---|---|
| JP | 5-172139 | * | 7/1993 |
| JP | 0649824 U | | 7/1994 |
| JP | 07-071455 A | | 3/1995 |
| JP | 07-293561 A | | 11/1995 |
| JP | 2004-124957 A | | 4/2004 |
| JP | 2008-281091 A | | 11/2008 |

* cited by examiner

*Primary Examiner* — James Pilkington
(74) *Attorney, Agent, or Firm* — Browdy and Neimark, PLLC (57) ABSTRACT

An inside seal is installed to make close contact with a lower surface of a slider to exclude foreign material from circulating circuits, ensuring smooth sliding movement of the slider relative to a guide rail. The inside seal is composed of a major portion made of an elastic member and a metallic core, an elastic lip extending sidewise from a lengthwise side of the major portion to come into sliding contact with a guide rail, and hooked portions upright to fit into slots on end caps to keep in place the inside seal. Another longitudinal side has elastic edges to come into elastic abutment against the inside wall surface of the end cap.

6 Claims, 11 Drawing Sheets

LINEAR MOTION GUIDE UNIT WITH INSIDE SEAL

FIELD OF THE INVENTION

The present invention relates to a linear motion guide unit befitted to machinery including machine tools, and so on, which are needed to operate in severe working environment where much foreign materials including chips, debris, dirt, dusts, and so on occurs. More particularly, it relates to a linear motion guide unit with an inside sealing member to keep load-carrying races free of any foreign material creeping into a slider that fits over or conform to a guide rail for relative sliding movement.

BACKGROUND OF THE INVENTION

As the machinery having the modern linear motion guide units increasingly needs to work over a prolonged service life even under harshest atmosphere in which much foreign material including chips, debris, dirt, dusts, processing fluids and so on occurs, applications of the linear motion guide units grow in recent years to a variety working sites and installation sites. Making sure of operation of the linear motion guide units in the harshest environment is first to keep the interior of the slider free of foreign materials or contaminants. Even with any invasion of outside foreign materials into the slider, the most significant issue is how to protect at least the circulating circuit including the load-carrying races to allow the rolling elements running through there against the foreign materials or contaminants. What's more, many of modern linear motion guide units are customized to have no conventional dustproof means including a telescopic cover, bellows, and so on despite laying their guide rails bare to the severe working atmospheres from the aspect of making the guide units themselves compact in construction, cost savings on installations, and so on while keeping the circulating circuits for the rolling elements free of the foreign material or contaminants.

Figure 20:
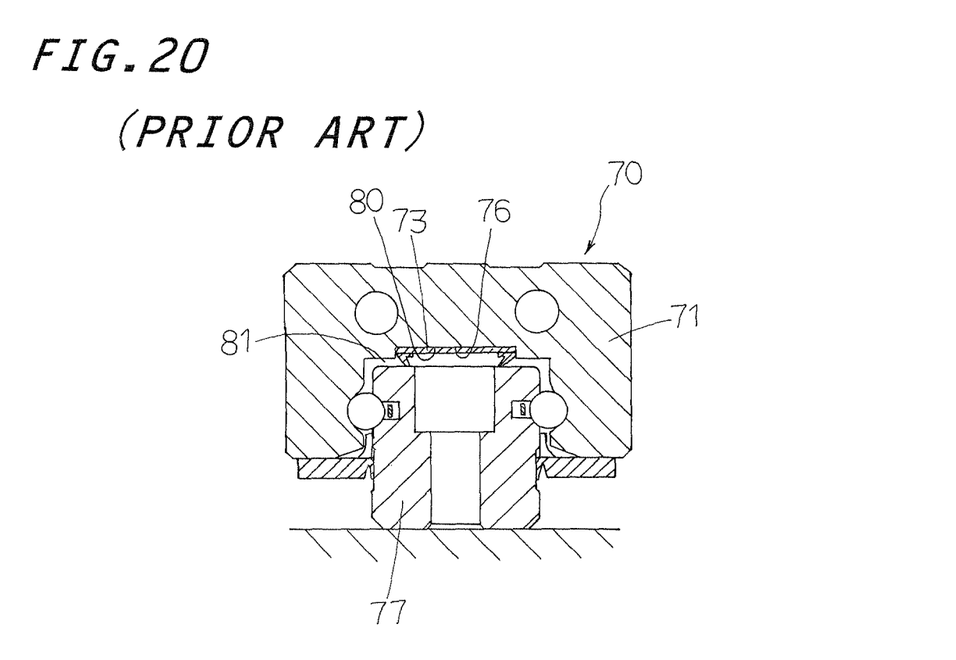
FIG. 20 is a view in section of a conventional linear motion guide unit.
Figure 21:
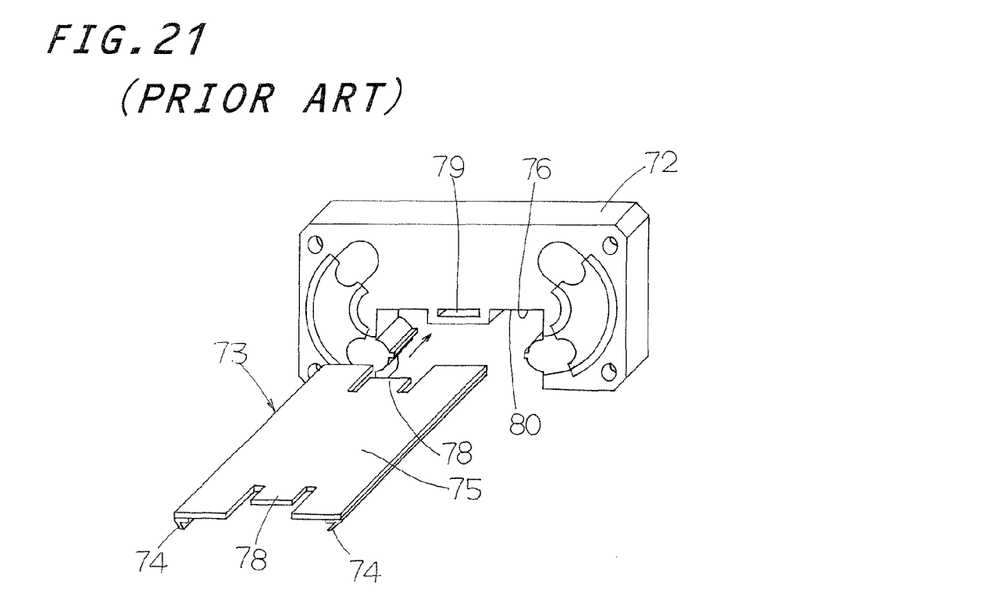
FIG. 21 is an exploded view in perspective showing an assembled relation of an upper seal with the end cap in the conventional linear motion guide unit of FIG. 20.

A linear motion guide unit is disclosed in Japanese Laid-Open Patent Application No. H07-293 561 which is one of the common-assigned JP patent applications. With the prior linear motion guide unit, the upper seal 73 as shown in FIGS. 20 and 21 may be demounted from the slider 70 without removal of the end cap 72 from carriage 71. The upper seal 73 serving as the inside seal in the linear motion guide unit constructed as stated earlier is composed of the metallic core plate 75 whose widthwise opposed side edges have lip seals 74. The upper seal 73 is provided at lengthwise opposite ends thereof with projecting tongues 78. The upper seal 73 is kept inside the grooves 76 after the projecting tongues 78 have been inserted into the slots 79 made in the end caps 72. With the prior linear motion guide unit constructed as stated earlier, as the structure to retain the upper seal 73 is provided between the concaved lower surfaces 80 inside the slider 70 and the top surface 81 of the guide rail 77, the concaved lower surfaces 80 of the slider 70 have to be machined or cut to ensure the space to stow the upper seal 73 and make the grooves 76 to retain the upper seal 73.

Another commonly-assigned Japanese Laid-Open Patent Application No. 2008-281 091 discloses a linear motion guide unit with an inside seal to keep the circulating circuit including the load-carrying races free of any foreign material creeping into a slider even in harshest operating atmosphere in which much foreign material occurs. This prior linear motion guide unit has a lip-type inside seal constructed as stated earlier. The lip-type seal is installed in the linear motion guide unit in a fashion introduced aslant relative to the end caps while getting tongue lugs at opposite ends of the inside seal inserted into the slots in the lower surfaces of the end caps. The structure to retain the inside seal is provided between the lower surface of the slider and the top surface of the guide rail. Thus, it is needed to cut or machine the concaved lower surface of the carriage to ensure the space to stow the upper seal and make the grooves in the end caps to retain the upper seal.

Another commonly-assigned Japanese Laid-Open Utility Model Application No. H06-49 824 discloses a linear motion guide unit with a lower seal. Sidewise opposed bulges of the inverted U-shaped end cap have grooves on their inside surfaces opposing to the guide rail. The lower seal at opposite ends thereof has hooked engaging portions which fit into the grooves to retain the lower seal to the end cap. The lower seal has a metallic core plate which is bent to make the hooked engaging portion to make into engagement with the end cap.

Another commonly-assigned Japanese Laid-Open Patent Application No. H07-71 455 discloses a linear motion guide unit in which a lower seal is installed with the help of the space reserved in the carriage for a grindstone. With the linear motion guide unit constructed as stated earlier, the lower seal is installed in the space for a grindstone reserved on the slant surface lying on the lower surface of the carriage in adjacency to the guide rail. The lower seal at the lengthwise opposite ends thereof has upright brackets with engaging hooks and correspondingly the end caps have mating holes to make engagement with the hooks on the lower seal.

Figure 22:
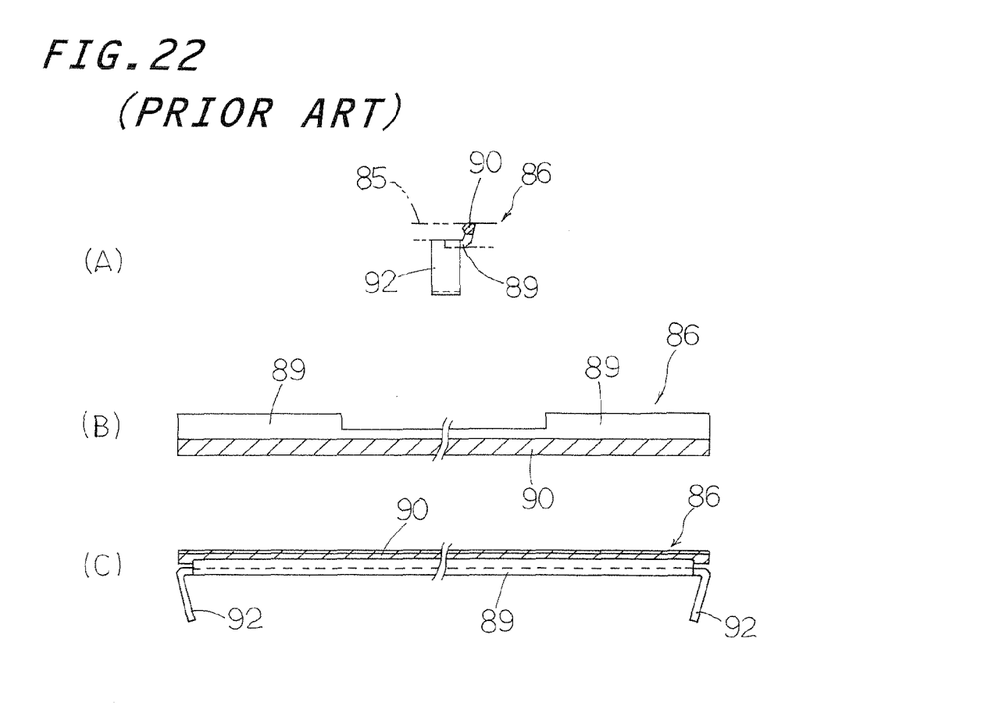
Figure 23:
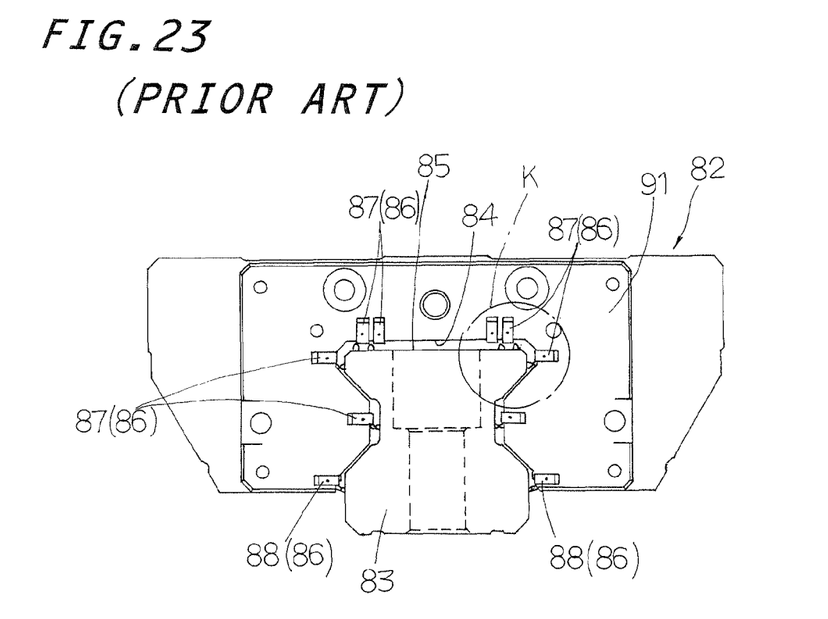
FIG. 23 is a view in front elevation of the conventional linear motion guide unit to show a version of the sealing member of FIG. 22, in the view an end plate is shown removed from the linear motion guide unit.
Figure 24:
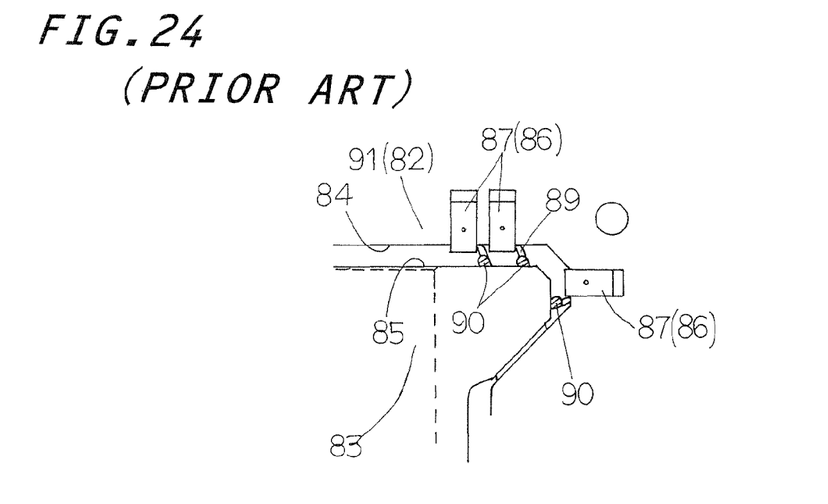
FIG. 24 is an enlarged fragmentary view showing a sealing member, in particular portion encircled with a sign K of FIG. 23.

A further another Japanese Laid-Open Patent Application No. 2004-124 957 discloses the linear motion guide unit having sealing members 86 sharing inside seals 87 with lowers seals 88 as shown in FIGS. 22 to 24. The linear motion guide unit is composed of a guide rail 83 and a slider 82 with end lids 91. The slider 82 fits over or conforms to the guide rail 83 for movement in a sliding manner relative to the guide rail 83. The slider 82 has the sealing members 83 serving as both the inside seals 87 and the lower seals 88. The sealing member 86 is composed of a metallic core 89 of substantial L-shape in a transverse section and a lip 90. The sealing member 86 has lengthwise opposite ends 92 bent on opposite side of the lip 90 to provide fastening means. The sealing member 86 is fastened to the concaved surface 84 of the slider 82, facing on the top surface 85 of the guide rail 83. The metallic core 89 on the sealing member 86 is set to protrude from the concaved surface 84 of the slider 82 towards the guide rail 83. Moreover, the metallic core 89 is elastic or resilient to control adequately the frictional resistance of the sealing member 86 against the guide rail 83. The sealing member 86 is beneficial when the concaved surface 84 of the slider 82 is spaced from the top surface 85 of the guide rail 83 across the significant interval. On the contrary, the sealing member 86 constructed as stated earlier couldn't be befitted for the linear motion guide unit in which there is less in spacing interval between the concaved surface 84 of the slider 82 and the top surface 85 of the guide rail 83.

Most inside seals used in the linear motion guide units conventionally have a flat configuration of which widthwise opposite edges have sealing lips. The inside seals at their lengthwise opposite ends have tongue projections to keep the inside seals on the slider and, correspondingly the end caps have sockets designed to fit over the tongue projections of the inside seals to hold the inside seals on the slider. If there is less in spacing interval between the concaved surface of the slider and the top surface of the guide rail, it is needed to cut or machine the groove in the concaved surface to stow the inside seal in the slider. This additional procedure would introduce costly machining requirements Moreover, there is left a clearance between the tongue projections of the inside seal and the sockets of the slider and, therefore, mounting and demounting of the inside seal from the slider may be easily carried out only by unfastening or loosing fastening bolts to dislodge just the inside seal. As a result, there is the possibility the inside seal shifts out of place relative to the slider while the slider moves along the guide rail unless the slider at the opposite ends thereof has the end seals to press down the opposite ends of the inside seal. The inside seal, as suffered to a reaction owing to any interference against the top surface of the guide rail, experiences a reaction caused by frictional resistance encountered on the seal lips and correspondingly the tongue projections on the inside seal are suffered to any load of moment direction. This means that the tongue projections on the inside seal is liable to adversely cause any deformation under either of the reaction owing to any interference of the seal lips and the bending reaction caused by frictional resistance because the inside seal is made of the metallic core of the flat thin configuration.

With prior linear motion guide unit constructed as stated earlier, the seal lip fastened to the foremost end of the inside seal, because of very tiny in size and in adhered area to the inside seal, is easily come off the metallic core of the inside seal owing to the frictional resistance while the slider slides along the guide rail. Moreover, the inside seal needs to precisely control the member for the seal in thickness and contour because the resiliency of the metallic core for the inside seal has a major influence on adjustment of the contact pressure of the seal lip and fastening function of the inside seal to the end cap.

SUMMARY OF THE INVENTION

The present invention has for its primary object to overcome the major challenge as stated earlier. To this end, the inside seal constructed according to the present invention has thick bracing portions, tight-contact ends and tight-contact inner edges to keep accurately in place the inside seal and at the same time to ensure the close contact between mating parts or components thereby to improve the dustproof of the inside seal. Especially, after the thick bracing portion has come into close contact with the inside wall surface of the end cap, the hooked portion fitted into the slot in the end cap is urged against one side of the slot to keep in place the inside seal and at the same time the thick bracing portion come into close contact with the lower surface of the end cap and the inside wall surface of the end cap to exclude foreign materials from load-carrying races. Moreover, the tight-close end surfaces on the forward and aft ends of the inside seal are raised somewhat above the outside surfaces of the hooked portions and made of the elastic members to make close contact with the end seals to exclude foreign materials. The longitudinal side opposite to the longitudinal side joining with the lip across the flat major portion of the inside seal is constituted with the elastic member at locations one of which comes into close contact with the inside wall surface around the rounded corner in the carriage and the other of which comes into the inside wall surface of the end cap. As a result of the close contact constructions as stated earlier, there is provided the linear motion guide unit in which the inside seal having the elastic member is effective to exclude foreign materials from the load-carrying races even in machinery operated under harshest atmosphere in which much foreign material occurs.

The present invention is concerned with a linear motion guide unit; comprising an elongated guide rail having two sides, each side having a first raceway groove extending in a longitudinal direction of the guide rail, and a slider having second raceway grooves lying in opposition to the first raceway grooves of the elongated guide rail, the slider being composed of a carriage which fits or conforms over the guide rail to move in the longitudinal direction of the elongated guide rail in a sliding manner with a plurality of rolling elements allowed to roll through load-carrying races defined between the first raceway grooves and the second raceway grooves, end caps secured to forward and aft ends of the carriage, one to each end, end seals attached on outward end surfaces of the end caps, one to each end cap, and a pair of inside seals installed between a top surface of the guide rail and both a lower surface of the carriage and lower surfaces of the end caps lying in opposition to the top surface of the guide rail, wherein the inside seals are installed along the load-carrying races, one to each race, wherein the inside seals each have a flat major portion of elastic member extending lengthwise of the inside seal in parallel with one of the load-carrying races and making close contact with the lower surface of the carriage and lower surfaces of the end caps, a lip of the elastic member extending sidewise beyond one of longitudinal sides of the flat major portion across an overall length of the major portion to makes a sliding close contact with the top surface of the guide rail throughout the overall length of the lip, and flat hooked portions upright at lengthwise ends of the major portion at right angles to the major portion so as to fit into slots on the outward end surfaces of the end caps to keep in place the inside seal relative to the end caps.

The flat hooked portions each have a hooked end which has a widthwise dimension larger than a widthwise dimension of the slot and extends in parallel with the major portion and in a direction sidewise opposite to the lip. Moreover, both the hooked portions and the flat major portion are made of the elastic member and a metallic core adhered to the elastic member. Forward and aft ends of the flat major portion are made integral with the elastic member to extend beyond outward surfaces of the hooked portions to make close contact with the end seals.

The flat major portion at locations lying underneath the lower surfaces of the end caps has another longitudinal side opposite to the longitudinal side joining with the lip across the flat major portion, the another longitudinal side having an elastic contact surface extending to an inside wall surface inside the end cap to make elastic abutment against the inside wall surface of the end cap, thereby urging the hooked portion towards one side of the slot to keep in place the inside seal. Moreover, the flat major portion of the inside seal has the another longitudinal side opposite to the longitudinal side joining with the lip across the flat major portion and the another longitudinal side is made of the elastic member, the another longitudinal side having a tight-contact concave inner edges to closely embrace a rounded corner where the longitudinal side end of the major portion intersects with the lower surface of the carriage and further having an elastic surface to make elastic close contact with an inside wall surface in the end cap.

The outward end surface of the end cap recessed to leave a frame so as to surround around the recess, and the slot to fit over the hooked portion is formed in the frame so that the hooked portion of the inside seal fits into the slot and further fits into the recess. Moreover, the hooked portions of the inside seal is grasped or caught between the end cap and the end seal.

With the linear motion guide unit constructed as stated earlier, as the structure to retain the inside seal like prior construction isn't formed between the lower surface of the slider and the top surface of the guide rail, the inside seal itself can be made less in thickness dimension and, therefore, installed even in the linear motion guide unit less in the interval or spacing between the lower surface of the slider and the top surface of the guide rail. With the linear motion guide unit of the present invention thus, there is no need for the lower surface of the carriage to machine the groove thereon which has been desired inevitably for the conventional inside seals. As a result, the carriage may be less in production cost and, further, there is no need to prepare the carriage dedicated to use of the inside seal. The inside seal of the present invention is just caught at opposite ends thereof between the outward surfaces of the end caps and the end seals so as not to get out of position in the longitudinal direction of the slider while the slider moves relative to the guide rail. Moreover, the inside seal is tough to be out of the top surface of the guide rail so that the lip securely keeps contact with the top surface of the guide rail to maintain the dustproof sealing performance to exclude foreign materials. The hooked portions to fasten the inside seal at lengthwise opposite ends thereof, because of bent at right angles to the lip, are hard to suffer deformation under the load exerted on the inside seal. Thus, the load-carrying races are effectively protected from invasion by foreign materials which would otherwise cause any trouble to linear motion guide unit. Moreover, the hooked portions of the inside seal, as formed to protrude widthwise of the slider, has no need to cut the deep slot to fit over the hooked portion in the end surface of the end cap and makes it possible to good use the recess in the end cap.

Though the inside seal suffers a turning force because of a reaction force caused by interference of the sealing lip and sliding resistance, the hooked end of the hooked portion stands against the frame in the end cap, thereby fastening the inside seal. Nevertheless, the hooked portions are made upright at the side lying widthwise opposite to the lip to have the inverted L-shape and further the hooked ends extend in the direction opposite to the lip. The structure in the end cap to hold the inside seal makes use of only the recess on the outward end surface of the end cap other than the provision of the slots cut in the inner frame of the end cap and, therefore, the inside seal may be retained in the end caps with only the simple structure. The inside seal has a thin plate configuration fastened in a way coming into close contact with the lower surface of the carriage and the lower surface of the end caps. The lip of the inside seal across the overall length thereof makes close contact with the top surface of the guide rail 1. The interference of the lip comes into close contact with the top surface of the guide rail 1, displaying the dustproof performance.

BRIEF DESCRIPTION OF THE DRAWINGS

FIG. 22 is a view showing a sealing member in the conventional linear motion guide unit, in which FIG. 22(A) is a view in front elevation and FIG. 22(B) is a view in plan and FIG. 22(C) is a view of longitudinal side elevation of sealing member.

DETAILED DESCRIPTION OF THE PREFERRED EMBODIMENTS

The linear motion guide unit equipped with an inside seal constructed according to the present invention is best adapted for use in machinery as diverse as machine tools including cutting machines, grinding machines and woodcutting machines, and other industrial machines, which are needed to operate in worse working environment because of the occurrence of much foreign materials including dust, chips, cutting debris, and so on, or the presence of splashed fluids of cutting fluids, coolants, and so on. In the worse working conditions as stated earlier, the load-carrying races defined between a guide rail and a slider moving on the guide rail must be especially kept free of all possible foreign materials or contaminants, even when they could creep into the interior of the slider along the guide rail.

Referring now in detail to the drawings, the linear motion guide unit with the inside seal constructed according to the present invention will be explained below. With the linear motion guide unit, an inside seal 7 installed on concaved lower surfaces 28 and 29 of a slider 2 helps to exclude securely any foreign material from circulating circuits, even in worse working conditions encountered in the machinery of the sort as stated earlier. In the version or embodiment disclosed, the linear motion guide unit is of such construction that balls 5 of rows are used as the rolling elements. Especially, the inside seal 7 of the present invention is befitted for the linear motion guide unit in which a clearance lying between lower surfaces 28 and 29 of the slider 2 and a top surface 22 of a guide rail 1 is very narrow or small in height.

Figure 1:
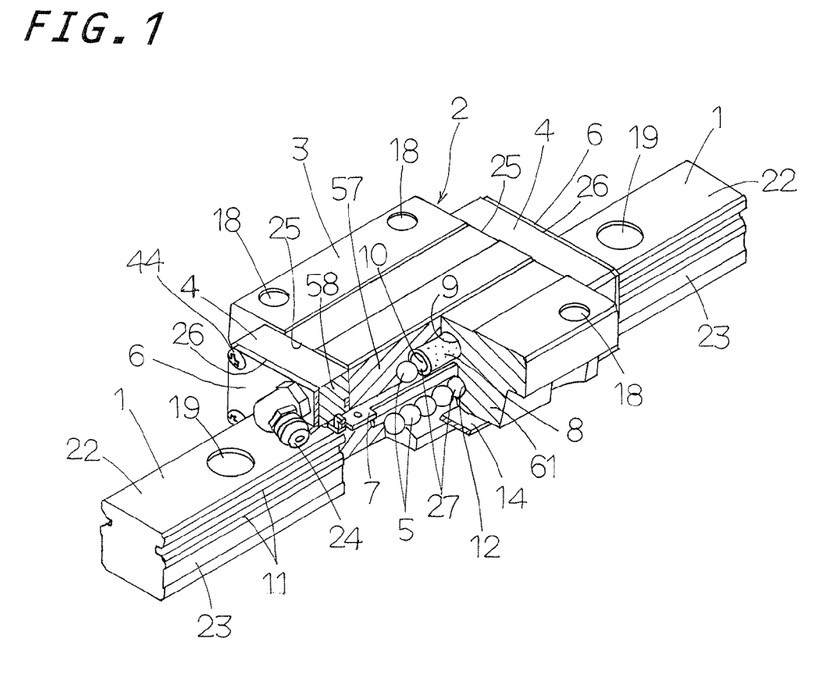
FIG. 1 is a partially cutaway view in perspective illustrating a preferred embodiment of a linear motion guide unit equipped with an inside seal constructed according to the present invention.

The linear motion guide unit, as shown in FIG. 1, is mainly comprised of an elongated guide rail 1 having bolt holes 19 extending through from a top surface 22 to a bottom surface used to fasten the guide rail 1 to any machine base and so on, the elongated guide rail 1 further having two longitudinal sides 23, each side having a pair of first raceway grooves 11 extending lengthwise of the guide rail 1, and a slider 2 that fits over or conform to the guide rail 1 for movement in a sliding manner relative to the guide rail 1 by rolling elements, the slider having a pair of second raceway grooves 12 extending in opposition to the pair of the first raceway grooves 11 of the guide rail 1 to provide a pair of load-carrying races 27 between the pair of first raceway grooves 11 and the pair of second raceway grooves 12. Although but the rolling elements are balls 5, it will be appreciated that rollers may be used. The slider 2 is mainly composed of a carriage 3 having a pair of return passages 10 lying in parallel with the pair of load-carrying races 27 defined between the first raceway grooves 11 and the second raceway grooves 12, the carriage 3 further having threaded holes 18 which are used to fasten a diversity of instruments, works, parts, components and so on to the slider 2, forward and aft end caps 4 disposed on lengthwise opposing end surfaces 25 of the carriage 3 and further provided therein with curved turnaround passages 60 to join the fore-and-aft load-carrying races 27 to the return passages 10, respectively, and end seals 6 arranged on outward surfaces 26 of the end caps 4. The ball rolling elements 5 are allowed to roll through circulating circuits, each of which is made up of the load-carrying race 27, the return passage 10 and a pair of the forward and aft turnaround passages 60.

Figure 2:
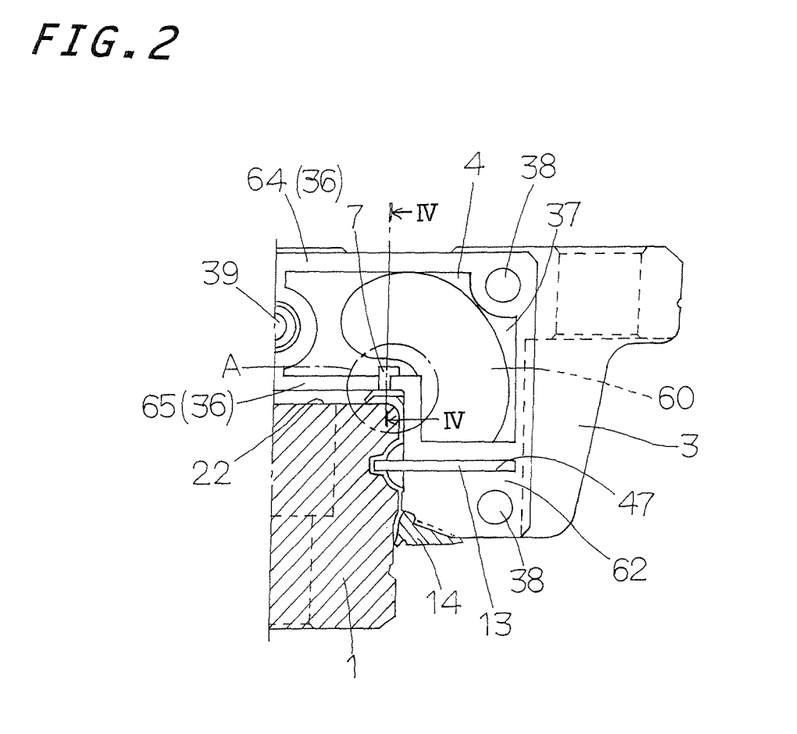
FIG. 2 is a view in front elevation showing a right half of the linear motion guide unit shown in FIG. 1, in the view a grease nipple and an end seal are shown removed from the linear motion guide unit.
Figure 6:
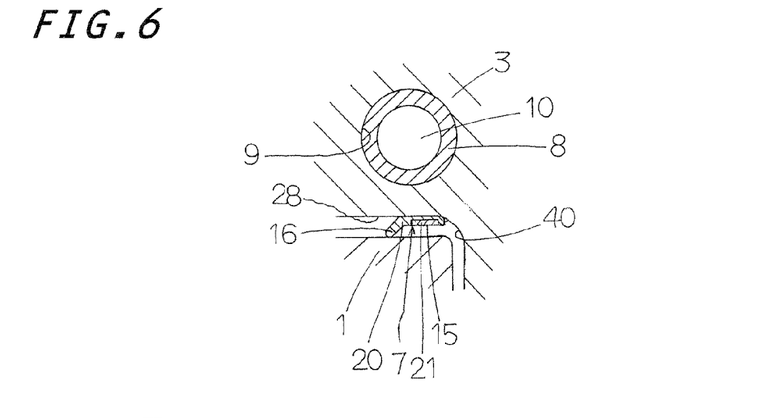
FIG. 6 is an enlarged fragmentary view in section showing in detail around the inside seal, the view being taken on the plane of the line VI-VI of FIG. 4 after an end seal has been demounted.
Figure 17:
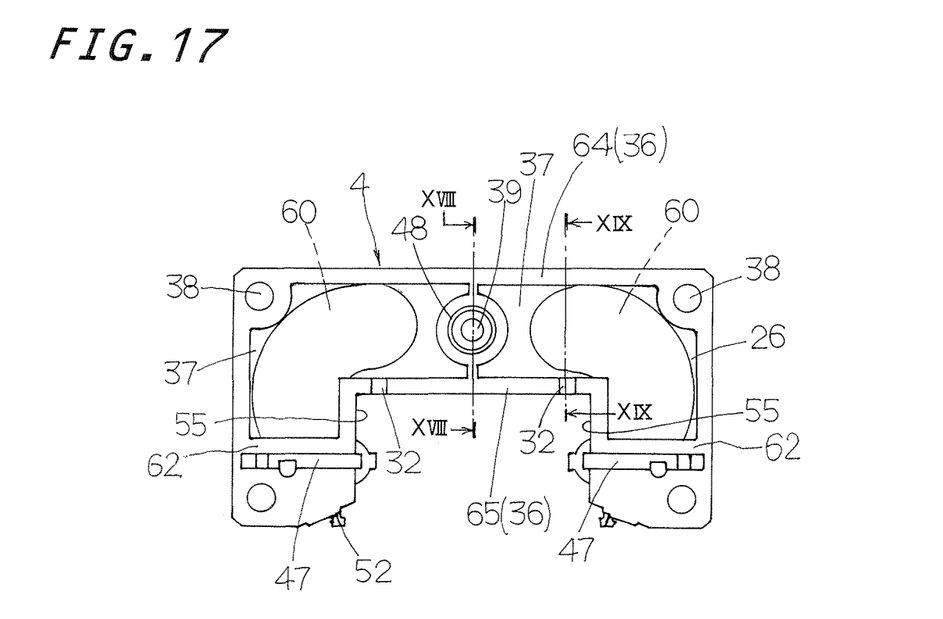
FIG. 17 is a view in end elevation of an end cap, the view showing an outward side of the end cap on which an end seal is attached.
Figure 18:
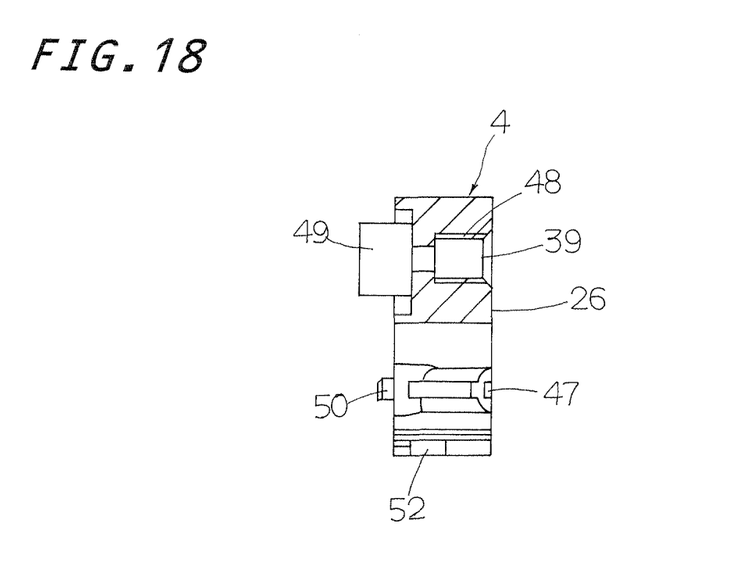
FIG. 18 is a view in section of the end cap of FIG. 17, the view being taken on the plane of the line XVIII-XVIII of FIG. 17.
Figure 19:
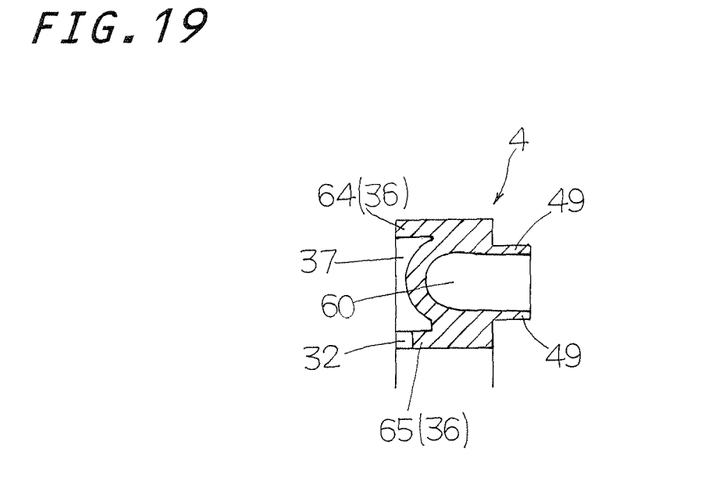
FIG. 19 is a view in section of the end cap of FIG. 17, the view being taken on the plane of the line XIX-XIX of FIG. 17.

The carriage 3 is constituted with a major middle upper portion 57 lying just above the top surface 22 of the guide rail 1 and a pair of side bulges 61 spreading from widthwise opposite edges of the major middle upper portion 57 downwards along the sides 23 of the guide rail 1 to stride across the guide rail 1. The end cap 4 is constituted with a major upper portion 58 lying just above the top surface 22 of the guide rail 1 equivalent to the major upper middle portion 57 of the carriage 3, and a pair of bulges 62 spreading from widthwise opposite edges of the major upper portion 58 downwards along the sides 23 of the guide rail 1 equivalent to the side bulges 14 of the carriage 3 to stride across the guide rail 1. The end cap 4 as shown in FIGS. 17 and 18 has a spigot to locate accurately the end cap 4 relative to the carriage 3 and a connector tube 49 to form the return passage in part to communicate the return passage 10 with the turnaround passage 60. Moreover, the end cap 4 has a lubrication port 39 to receive lubricant from a grease nipple 24, and bolt holes 38 into which fastening bolts 44 fit to secure the end cap 4 together with an end seal 6 onto the carriage 3. A sleeve 8 fits into a fore-and-aft hole 9 extending through the carriage 3 to provide the return passage 10. More especially, the bulges 61 of the carriage 3 each have the raceway groove 12 extending lengthwise of the carriage 3 and the major middle upper portion 57 of the carriage 3 has the fore-and-aft hole 9 into which the sleeve 8 fits to provide the return passage 10. A retainer band 13 as shown in FIG. 2 is to keep the balls 5 in the raceway groove 12 on the carriage 3 and comes into engagement at lengthwise opposite ends thereof with notches 47 of the end caps 4. The end seal 6 as shown in FIG. 6 has a lip 43 which comes into close contact with the guide rail 1. On the lower surface of the slider 2 as shown in FIG. 17, there are provided hooked parts 52 to which a lower seal 14 is held to extend along the slider 2 in the longitudinal direction of the slider 2. The grease nipple 24 is connected to the threaded hole 48 (refer to FIGS. 17 and 18) on the slider 2.

Figure 3:
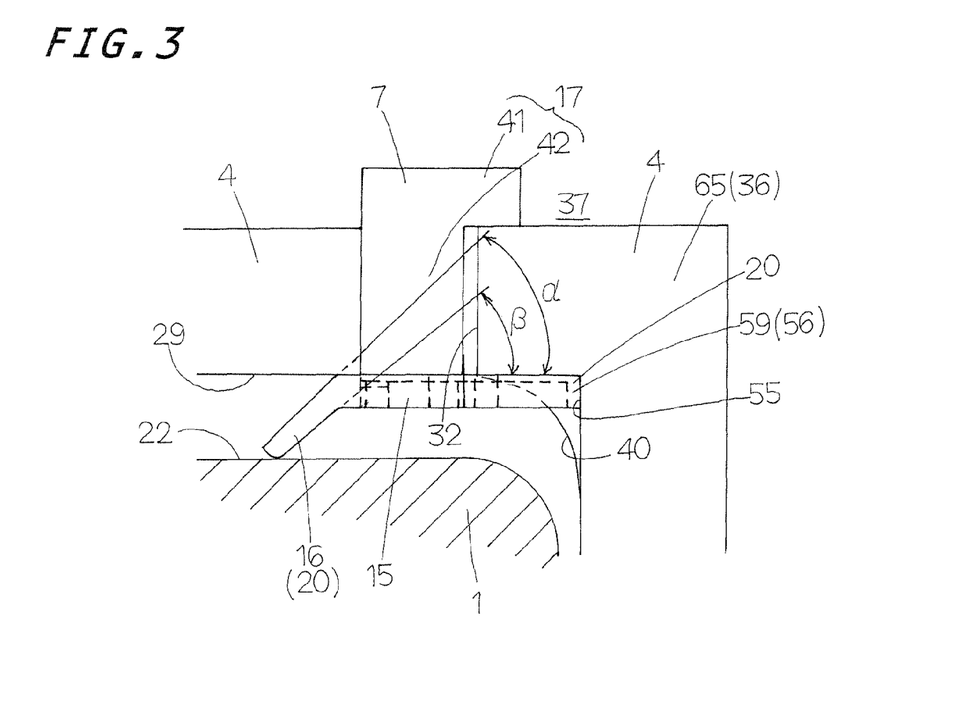
FIG. 3 is an enlarged fragmentary view in section showing in detail a particular portion encircled with a sign A of FIG. 2.
Figure 4:
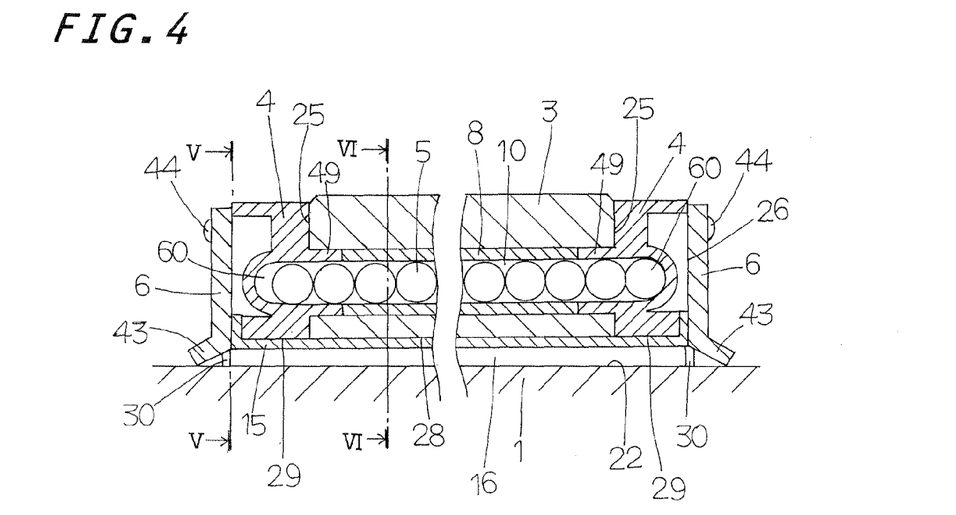
FIG. 4 is a fragmentary view in longitudinal section of the linear motion guide unit, the view being taken on the plane of the line IV-IV of FIG. 2.
Figure 5:
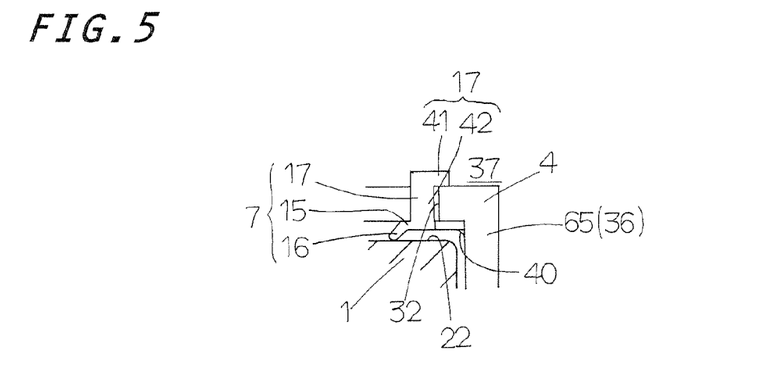
FIG. 5 is an enlarged fragmentary view in section showing in detail around the inside seal, the view being taken on the plane of the line V-V of FIG. 4 after an end seal has been demounted.
Figure 7:
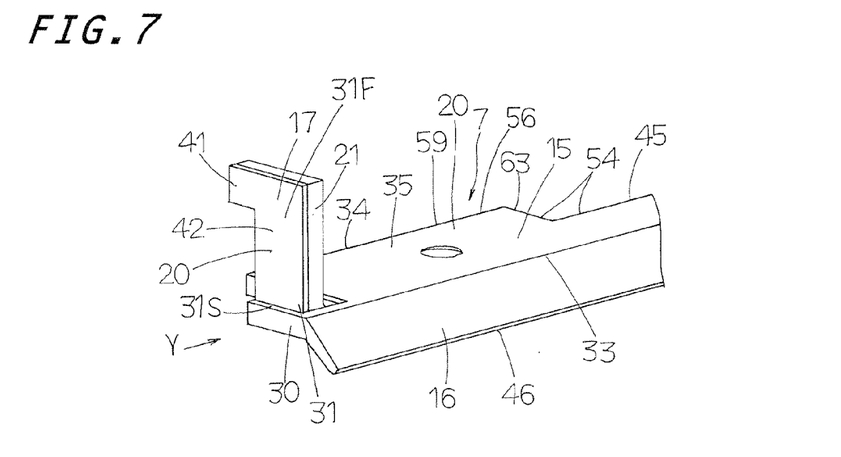
FIG. 7 is an enlarged fragmentary view in perspective especially showing in detail a hooked portion of the inside seal.

With the linear motion guide unit of the present invention, especially, a pair of the inside seals 7 as shown in FIGS. 1, 2 and 3 is placed between the top surface 22 of the guide rail 1 and the lower surface of the slider 2 inclusive of a lower surface 28 of the carriage 3 and lower surfaces 29 of the end caps 4 to keep the foreign materials against creeping into the load-carrying races 27. The inside seals 7 as shown in FIG. 4 are installed to extend along the longitudinal sides of the top surface 22 of the guide rail 1 to protect the load-carrying races 27, one to each race. Moreover, each of the inside seals 7, as shown in FIG. 3, is composed of a flat major portion 15 having an elastic member 20 of synthetic resin which extends in parallel with the load-carrying race 27 while coming into closely or tightly contact with the lower surfaces 29 (refer to FIG. 4) of the end caps 4 and the lower surface 28 (refer to FIG. 4) of the carriage 3, a longitudinal lip 16 extending sidewise beyond a longitudinal side edge 33 (refer to FIG. 7) of the major portion 15 to make a sliding contact with the top surface 22 of the guide rail 1 throughout the overall length of the lip 16, and flat hooked portions 17 upright at lengthwise ends of the major portion 15 at right angles to the major portion 15 so as to fit into slots 32 on outward end surfaces 26 of the end caps 4 to keep in place the inside seal 7 relative to the end caps 4. More especially, the inside seal 7 is shown in detail in FIGS. 7 to 16. Referring to FIG. 7, the major portion 15 of the inside seal 7 has thick bracing portions 35 spaced away each other to provide a recess 45 between them to fit over the carriage 3, and tight-contact ends 30 on forward and aft ends 31 of the inside seal 7. The hooked portions 17 each has at a foremost end thereof a wide hooked extremity heading a longitudinal side end 59 of the major portion 15 opposite to the side edge 33 adjacent to the longitudinal lip 16 across the thick bracing portion 15. Moreover, the major portion 15 and the pair of the hooked portions 17 are all made of metallic member covered with the elastic members 20. In addition, End surfaces 31S on the forward and aft ends 31 of the inside seal 7 are raised somewhat above outside surface 31F and integral with the elastic members 20 to provide the tight-contact ends 30.

Figure 8:
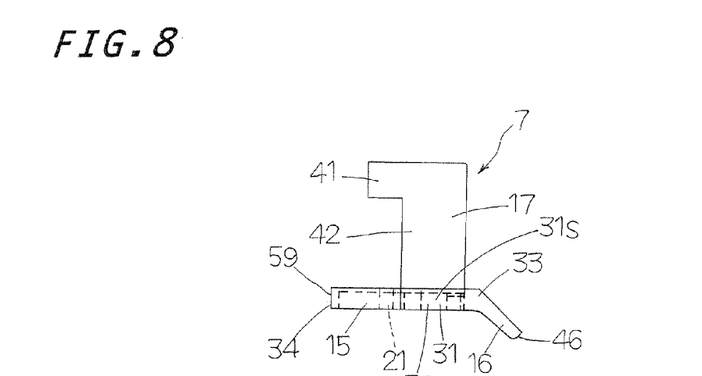
FIG. 8 is an enlarged view in front elevation showing the hooked portion of the inside seal of FIG. 7, as seen in the Y-direction of the figure.
Figure 9:
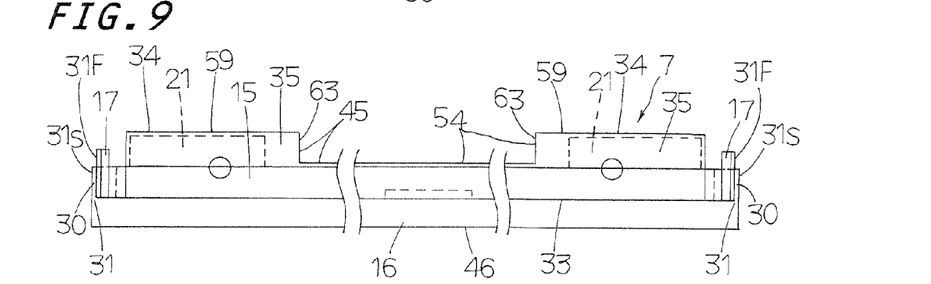
FIG. 9 is a view in plan of the inside seal.
Figure 10:
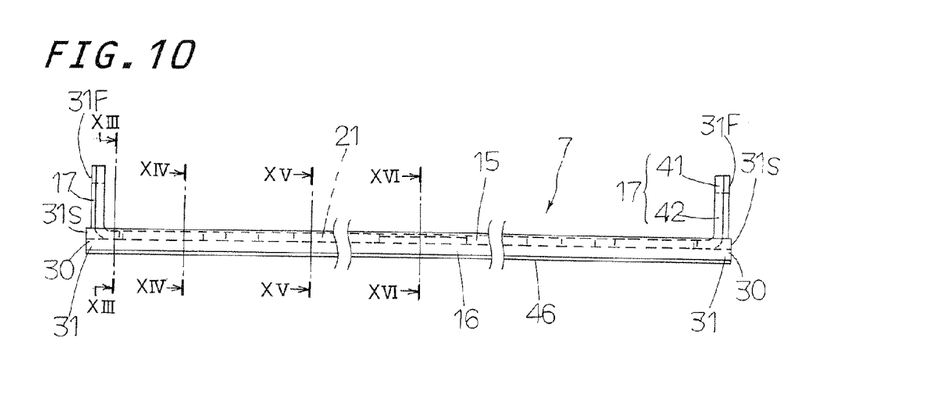
FIG. 10 is a view in side elevation of the inside seal of FIG. 9 to especially show a lip edge of the inside seal.
Figure 11:
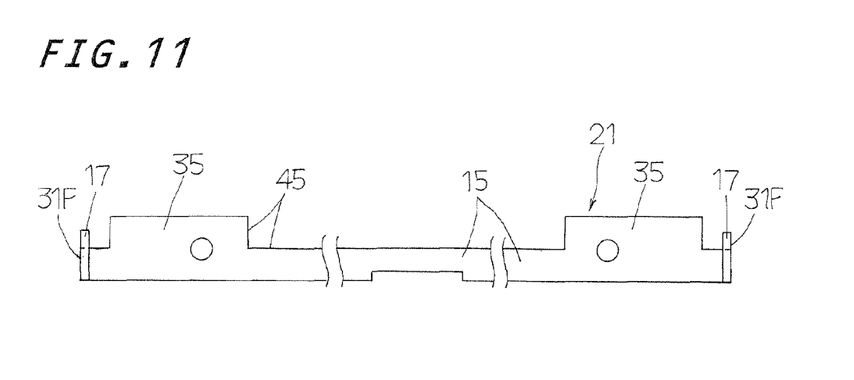
FIG. 11 is a fragmentary view in plan of a metallic core for the inside seal of FIG. 9.
Figure 12:
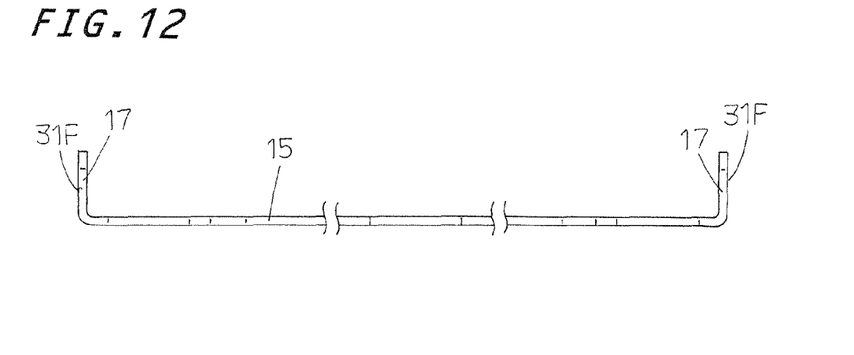
FIG. 12 is a view in side elevation showing the metallic core of FIG. 9.
Figure 13:
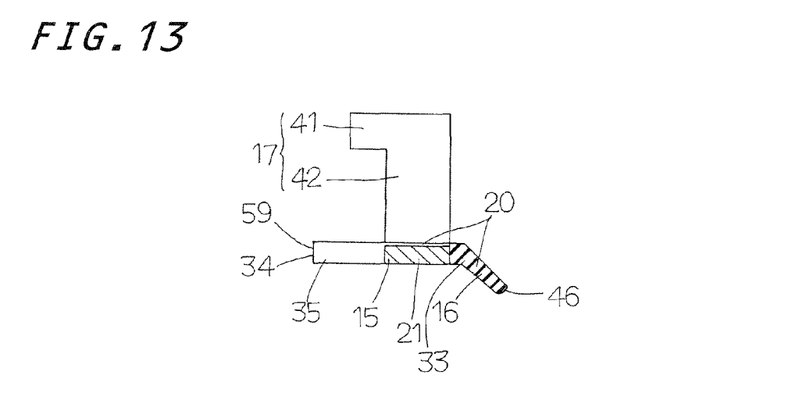
FIG. 13 is a view in section of the inside seal, the view being taken on the plane of the line XIII-XIII of FIG. 10.
Figure 14:
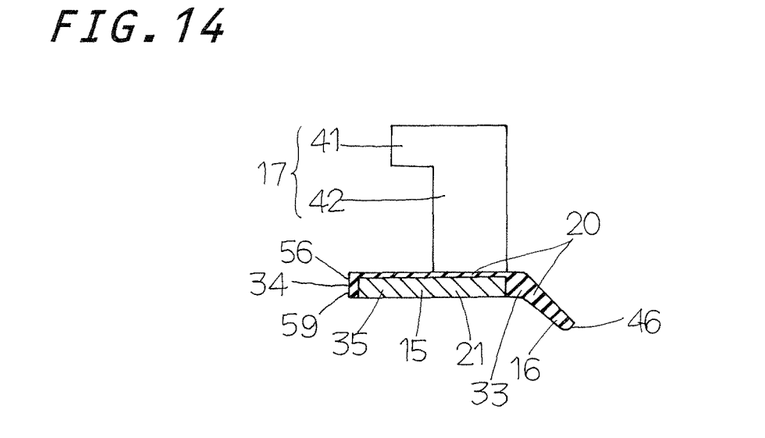
FIG. 14 is a view in section of the inside seal, the view being taken on the plane of the line XIV-XIV of FIG. 10.
Figure 15:
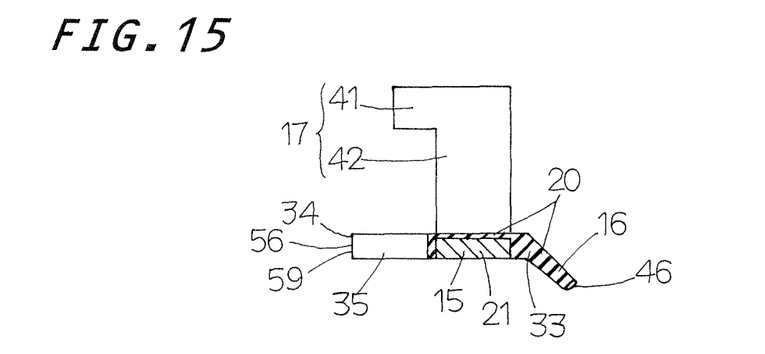
FIG. 15 is a view in section of the inside seal, the view being taken on the plane of the line XV-XV of FIG. 10.
Figure 16:
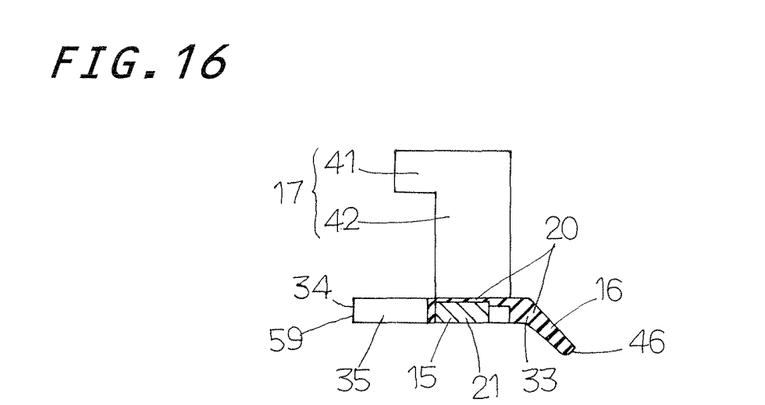
FIG. 16 is a view in section of the inside seal, the view being taken on the plane of the line XVI-XVI of FIG. 10.

With the major portion 15 of the inside seal 7 lying underneath the lower surface 29 of the end cap 4, as shown in FIGS. 7 to 9, the longitudinal side end 59 of the major portion 15 opposite to the side edge 33 adjacent to the longitudinal lip 16 across the thick bracing portion 15 has a longitudinal end surface 34 extending along an inside wall surface 55 of the end cap 4 to make abutment at a foremost side edge 56 thereof against the inside wall surface 55 of the end cap 4, thereby urging the hooked portion 17 towards one side of the slot 32 (refer to FIG. 3) in the end cap 4 to keep in place the inside seal 7. With the major portion 15 of the inside seal 7 lying underneath the lower surface 28 of the carriage 3 of the slider 2, as contrasted with the above, the longitudinal side end 59 of the major portion 15 opposite to the side edge 33 adjacent to the longitudinal lip 16 across the thick bracing portion 15 is made of the elastic member 20 throughout from the thick bracing portions 35 to make close contact with the inside wall surfaces 55 of the end caps 4 to tight-contact concave inner edges 54 defined between cut edges 63 to come into close contact with a rounded corner 40 where the longitudinal side end 59 of the major portion 15 intersects with the lower surface 28 of the carriage 3. With the structure constructed as stated earlier, the elastic member 20 helps keep effectively the foreign material such as dust and dirt against creeping into the load-carrying races 27 in the slider 2 even when the linear motion guide unit is used incorporated in facilities or equipment which are needed to operate in worse or severe working environment where much foreign materials including chips, debris, dirt, dusts, and so on occurs. The outward end surface 26 of the end cap 4 is recessed at 37 to leave a frame 36 so as to surround around the recess 37. The frame 36 is constituted with an outer frame potion 64 and an inner frame portion 65. The hooked portion 17 of the inside seal 7 fits into the slot 32 and further fits into the recess 37. Moreover, the hooked portion 17 of the inside seal 7 as shown in FIG. 4 is grasped or caught between the end cap 4 and the end seal 6.

More especially, the linear motion guide unit of the present invention features the construction of the inside seal 7. A pair of the inside seals 7 is installed underneath the lower surface of the slider 2 lying in opposition to the top surface 22 of the guide rail 1, or underneath all of the lower surface 28 of the major middle upper portion 57 of the carriage 3 and the lower surface 29 of the major upper portions 58 of the end caps 4 to extend in the longitudinal direction along the sides of the guide rail 1, one to each side, in parallel with each other. Namely, the inside seals 7 are placed underneath the middle upper portion of the slider 2 in adjacency of the sidewise bulges of the slider 2. The inside seal 7 in the perspective view of FIG. 1 is shown as an imaginary inside seal peeping out from the cutaway slider 2. The inside seal 7 may be used in either of rollers, not shown, and balls 5 irrespective of the shape and size of the slider 2. The embodied linear motion guide unit of the present invention had the guide rail 1 of widthwise dimension, for example a matter of 30 mm. The rolling elements were balls 5 and the slider 2 was a flanged type in structure, an upper surface of which had threaded holes 18 which were used to fasten the work, instrument and so on. The carriage 3 of the slider 2 has the forward and aft end surfaces 25 on which are attached the end caps 4, one to each end surface. The end seals 6 are attached on the outward end surfaces 26 of the end caps 4.

The linear motion guide unit of the present invention is envisaged working with maintenance-free condition for lubrication. The slider has circulating circuits to allow the ball rolling elements or balls 5 rolling through there, each of the circulating circuits being constituted with the load-carrying race 27, forward and aft turnaround passages 60 and the return passage 10. The carriage 3 has lengthwise holes 9 into which the sleeves 8 fit to define the return passages 10 therein. The linear motion guide unit of the present invention is envisaged realizing the maintenance-free operation for lubrication of the balls running through the return passages 10. To this end, the sleeves 8 is made from finely powder of ultrahigh molecular weight synthetic resin, which is first subjected to compacting and the resulting compact is subsequently sintered at elevated temperature. In the sleeves 8, fine particles of the synthetic resin partially coalesce with each other with leaving intercommunicating voids to provide open-porous or open-cellular texture whose pores or cells preserved among fine particles are open each other through interstices or channels. Lubricant is well absorbed and preserved in the pores or cells in the sleeves 8. As alternatives, polyurethane foam having open pores, a mixture of polyethylene with lubricant molded after heating and fibrous materials partially fused by heating of cellular structure may be used if they are able to preserve the lubricant therein. Moreover, the inside seal 7 is fastened with the upper surface thereof making contact with the lower surface 28 of the carriage 3 as well as the lower surface 29 of the end caps 4.

With the linear motion guide unit constructed as stated earlier, the inside seal 7 is constituted with the metallic core 21 and the elastic member 20 of rubber or synthetic resin. The inside seal 7 has the major portion 15, the lip 16 and hooked portions 17. The major portion 15 is a combination of the metallic core 21 with the elastic member 20, which is formed in a thin and flat plate of a length substantially same with the slider 2. With the inside seal 7 constructed as stated earlier, more especially, the elastic member 20 of the major portion 15 is designed to resiliently come into substantially air-tight close contact with the lower surface 28 of the carriage 3 and the lower surface 29 of the end caps 4, with leaving no space between the inside seal 7 and the carriage 3. Thus, any foreign materials remaining on the top surface 22 or in the threaded holes 19 of the guide rail 1 are certainly prevented from creeping into between the inside seal 7 and the lower surface 28 of the carriage 3 as well as the lower surface 29 of the end caps 4. Namely, the substantially air-tight close contact of the inside seal 7 with the carriage 3 as well as the end caps 4 prevents any foreign materials from entering from the upper side of the inside seal 7 into the load-carrying races 27.

The lip 16 is made of the elastic member 20 and extends askew downwards relative to the major portion 15 toward a widthwise center of the guide rail 1. The lip 16 as shown in FIG. 3 is defined with lengthwise surfaces lying aslant relative to the major portion 15 at angles of $\alpha$ and $\beta$, for example, $\beta\sim\alpha$ is 40~45 degrees, relative to the major portion 15, so that the lip 16 has a wedged shape tapered off towards the edge 46 so as to get more slender as the lip 16 advances to the edge 46. With the inside seal 7 constructed as stated earlier, the major portion 15 had the thickness of 0.6 mm, or 1.4 mm inclusive of the lip 16. The edge 46 of the lip 16 is made to have the rounded shape of R 0.2.

With the inside seal 7 constructed as stated earlier, the hooked portions 17 are provided at the forward and aft ends of the inside seal 7, one to each end. Each of the hooked portions 17 is composed of a connecting part 42 bent upward relative to the major portion 15 to rise upright and a hooked end 41 to come into engagement with the frame 36 of the end cap 4. The hooked portion 17 has the inverted L-shape when viewed in the front elevation and the connecting part 42 has the metallic core 21 bent upward relative to the major portion 15 to rise upright to connect the hooked end 41 to the major portion 15. The hooked end 41 of the hooked portion 17 is united with the connecting part 42 to extend in the direction sidewise opposite to the lip 16. Moreover, the hooked end 41 of the hooked portion 17 has a widthwise dimension larger than a widthwise dimension of the slot 32 cut in, for example, the inner frame portion 65 of the frame 36 of the end cap 4. The connecting part 42 of the hooked portion 17 has a size which is allowed to fit snugly into the slot 32 cut in the inner frame portion 65 of the frame 36 of the end cap 4. The hooked end 41 of the hooked portion 17 may have any shape other than the inverted L-shape as stated earlier, for example a T-shape having extensions on opposite sides of the connecting part 42 of the hooked portion 17, unless the hooked end 41 is certainly caught on the inner frame portion 65 of the frame 36 without falling off the slot 32 to the guide rail 1. The embodied hooked end 41 extended opposite to the lip 16 had a thickness of 0.5 mm which was sufficient to suffer a reaction against moment acting on the lip 16.

The inside seal 7 is held on the top surface 22 of the guide rail 1 with an interference of, for example nominal dimension of 0.4 mm. The longitudinal side end 59 of the major portion 15 opposite to the lip 16 is made in the foremost side edge 56 which comes into air-tight contact with the inside wall surface 55 in the bulge 62 of the end cap 4. With the linear motion guide unit of the present invention, the rounded corner 40 on the concaved inside wall surface in the carriage 3 is made to get closer to the guide rail than the inner frame portion 65 of the frame 36 in the end cap 4. The inside seal 7 as shown in FIG. 9 has the recess 45 extending across the overall length of the carriage 3. Preferably, the longitudinal dimension of the recess 45 is determined somewhat less than the overall length of the carriage 3 or the length between the forward and aft end surfaces 25 of the carriage 3 to make sure of better airtight closing contact between the inside seal 7 and the carriage 3. More especially, it is favorable that the overall length of the carriage 3 is determined less than the length of the metallic core 21 to define the recess 45, but longer than the length of the elastic member 20 across the recess 45 so that the elastic members 20 is suffered to compression to keep the airtight contact better between the carriage 3 and the elastic member 20. The end cap 4 is provided therein with the turnaround passages 60 to let the balls 5 turn round from the load-carrying race 27 to the return passage 10 and vice versa. Moreover, the end cap 4 has the recess 37 defined with the outer frame portion 64 and the inner frame portion 65.

What is claimed is:

1. A linear motion guide unit comprising:
    an elongated guide rail having two sides, each side having a first raceway groove extending in a longitudinal direction of the elongated guide rail, and
    a slider having second raceway grooves lying in opposition to the first raceway grooves of the elongated guide rail, the slider comprising
        a carriage which fits or conforms over the elongated guide rail to move in the longitudinal direction of the elongated guide rail in a sliding manner,
        a plurality of rolling elements allowed to roll through load-carrying races defined between the first raceway grooves and the second raceway grooves,
        end caps secured to forward and aft ends of the carriage, one to each end,
        end seals attached on outward end surfaces of the end caps, one to each end cap, and
        a pair of inside seals installed between a top surface of the guide rail and both a lower surface of the carriage and lower surfaces of the end caps lying in opposition to the top surface of the guide rail,
    wherein the inside seals are installed along the load-carrying races, one to each load-carrying race,
    wherein the inside seals each have a flat major portion of an elastic member extending lengthwise of the inside seal in parallel with one of the load-carrying races and making contact with a lower surface of the carriage and a lower surface of each of the end caps,
    wherein a lip of the elastic member extends sidewise beyond a first longitudinal side of the flat major portion across an overall length of the major portion to make a sliding contact with a top surface of the guide rail throughout an overall length of the lip,
    wherein flat hooked portions extend upright at lengthwise ends of the major portion at right angles to the major portion so as to fit into slots on outward end surfaces of the end caps to keep the inside seals in place relative to the end caps, and
    wherein both the hooked portions and the flat major portion are made of the elastic member and a metallic core adhered to the elastic member.

2. A linear motion guide unit constructed as defined in claim 1, wherein the flat hooked portions each have a hooked end which has a widthwise dimension larger than a widthwise dimension of the slot and extends in a direction opposite to the lip.

3. A linear motion guide unit constructed as defined in claim 1, wherein forward and aft ends of the flat major portion are formed integral with the elastic member to extend beyond outward surfaces of the hooked portions to make contact with the end seals.

4. A linear motion guide unit constructed as defined in claim 1, wherein the flat major portion of the inside seal has a second longitudinal side opposite to the longitudinal side joining with the lip across the flat major portion and the second longitudinal side is made of the elastic member,
    wherein the second longitudinal side has a contact concave inner edge to embrace a rounded corner where an end of the second longitudinal side intersects with the lower surface of the carriage and a pair of elastic surfaces to make elastic contact with an inside wall surface in the respective end caps.

5. A linear motion guide unit constructed as defined in claim 1, wherein the hooked portions of the inside seal are grasped or caught respectively between the end cap and the end seal.

6. A linear motion guide unit, comprising:
    an elongated guide rail having two sides, each side having a first raceway groove extending in a longitudinal direction of the elongated guide rail, and
    a slider having second raceway grooves lying in opposition to the first raceway grooves of the elongated guide rail, the slider comprising
        a carriage which fits or conforms over the guide rail to move in the longitudinal direction of the elongated guide rail in a sliding manner,
        a plurality of rolling elements allowed to roll through load-carrying races defined between the first raceway grooves and the second raceway grooves,
        end caps secured to forward and aft ends of the carriage, one to each end,
        end seals attached on outward end surfaces of the end caps, one to each end cap, and
        a pair of inside seals installed between a top surface of the guide rail and both a lower surface of the carriage and lower surfaces of the end caps lying in opposition to the top surface of the guide rail,
    wherein the inside seals are installed along the load-carrying races, one to each load-carrying race,
    wherein the inside seals each have a flat major portion of an elastic member extending lengthwise of the inside seal in parallel with one of the load-carrying races and making contact with a lower surface of the carriage and a lower surface of each of the end caps,
    wherein a lip of the elastic member extends sidewise beyond a first longitudinal side of the flat major portion across an overall length of the major portion to make a sliding contact with a top surface of the guide rail throughout an overall length of the lip, wherein flat hooked portions extend upright at lengthwise ends of the major portion at right angles to the major portion so as to fit into slots on outward end surfaces of the end caps to keep the inside seals in place relative to the end caps, and wherein the flat major portion at locations lying underneath the lower surfaces of the end caps has a second longitudinal side opposite to the first longitudinal side, the second longitudinal side has an elastic contact surface extending to an inside wall surface of the end cap to make elastic abutment against the inside wall surface of the end cap, thereby urging the hooked portion towards one side of the slot to keep the inside seal in place.

* * * * *